United States Patent
Li et al.

(10) Patent No.: US 11,968,760 B2
(45) Date of Patent: Apr. 23, 2024

(54) IRRADIATION ANGLE ADJUSTMENT METHOD AND SYSTEM OF LAMP AND LAMP WITH ADJUSTABLE IRRADIATION ANGLE

(71) Applicant: OPPLE LIGHTING CO., LTD., Shanghai (CN)

(72) Inventors: Zhijun Li, Shanghai (CN); Jun Wu, Shanghai (CN); Zhenghua Zhang, Shanghai (CN)

(73) Assignee: OPPLE LIGHTING CO., LTD., Shanghai (CN)

(*) Notice: Subject to any disclaimer, the term of this patent is extended or adjusted under 35 U.S.C. 154(b) by 357 days.

(21) Appl. No.: 17/402,266

(22) Filed: Aug. 13, 2021

(65) Prior Publication Data

US 2021/0378075 A1 Dec. 2, 2021

Related U.S. Application Data

(63) Continuation of application No. PCT/CN2019/130138, filed on Dec. 30, 2019.

(30) Foreign Application Priority Data

Jan. 25, 2019 (CN) .......................... 201910074698.4
Jan. 25, 2019 (CN) .......................... 201920138528.3

(51) Int. Cl.
*H05B 47/13* (2020.01)
*F21V 21/14* (2006.01)

(52) U.S. Cl.
CPC ............. *H05B 47/13* (2020.01); *F21V 21/14* (2013.01)

(58) Field of Classification Search
CPC ..... F21Y 2115/10; F21Y 2113/13; F21S 4/28; H05B 45/10; H05B 45/20; H05B 47/11;
(Continued)

(56) References Cited

U.S. PATENT DOCUMENTS

| 7,583,901 B2 * | 9/2009 | Nakagawa ........... H05B 47/195 398/183 |
| 9,955,551 B2 * | 4/2018 | Spero ........................ F21K 9/23 |

(Continued)

FOREIGN PATENT DOCUMENTS

| CN | 101918754 B | * | 7/2012 | .......... F21V 23/0471 |
| CN | 205014298 U | | 2/2016 | |

(Continued)

OTHER PUBLICATIONS

International Search Report of PCT Application No. PCT/CN2019/130138 dated Mar. 26, 2020 with English translation, (4p).

*Primary Examiner* — Monica C King
(74) *Attorney, Agent, or Firm* — Arch & Lake LLP (57) ABSTRACT

The disclosure provides a method and a system for adjusting an irradiation angle of a lamp and a lamp with adjustable irradiation angle. The lamp includes a plurality of infrared receivers and a driving motor. The method comprises: receiving an infrared signal from a remote controller via the plurality of infrared receivers; determining an irradiation angle adjustment value of the lamp based on a plurality of infrared signal intensity values of the plurality of infrared receivers; adjusting an irradiation angle of the lamp via the driving motor based on the irradiation angle adjustment value. In the technical scheme provided by the example of the disclosure, when the irradiation angle of the lamp needs to be adjusted, the irradiation angle of the lamp is controlled only by operating the remote controller.

16 Claims, 3 Drawing Sheets

(58) Field of Classification Search
CPC ...... H05B 47/12; H05B 47/105; H05B 47/17; H05B 47/13; H05B 47/19; F21V 21/14
See application file for complete search history.

(56) References Cited

U.S. PATENT DOCUMENTS

| | | | |
|---|---|---|---|
| 2006/0056855 A1* | 3/2006 | Nakagawa | G09F 9/33 |
| | | | 398/183 |
| 2010/0001654 A1 | 1/2010 | Chen et al. | |
| 2012/0206050 A1* | 8/2012 | Spero | B60Q 1/1423 |
| | | | 315/152 |
| 2015/0035440 A1* | 2/2015 | Spero | B60Q 1/1423 |
| | | | 315/153 |
| 2018/0255622 A1* | 9/2018 | Spero | H05B 3/008 |
| 2021/0112647 A1* | 4/2021 | Coleman | H05B 45/12 |

FOREIGN PATENT DOCUMENTS

| | | |
|---|---|---|
| CN | 206207070 U | 5/2017 |
| CN | 206918814 U | 1/2018 |
| CN | 109640493 A | 4/2019 |

\* cited by examiner

IRRADIATION ANGLE ADJUSTMENT METHOD AND SYSTEM OF LAMP AND LAMP WITH ADJUSTABLE IRRADIATION ANGLE

CROSS-REFERENCE TO RELATED APPLICATIONS

This application is based upon and claims the priority of PCT patent application No. PCT/CN2019/130138 filed on Dec. 30, 2019 which claims priority to the Chinese patent application No. 201910074698.4 filed on Jan. 25, 2019 and the Chinese patent application No. 201920138528.3 filed on Jan. 25, 2019, the entire contents of which are hereby incorporated by reference herein for all purposes.

TECHNICAL FIELD

The disclosure relates to the field of lighting technology, especially to an irradiation angle adjustment method and system of a lamp and a lamp with adjustable irradiation angle.

BACKGROUND

With the rapid development of Internet of things and intelligent control technology, various intelligent products have sprung up. However, after the current lamps are installed, the irradiation angle of lamps is generally fixed, which cannot be adjusted according to requirements. The irradiation range of the lamps is small, for example, the guide rail spotlight is generally installed on the guide rail or directly installed on the ceiling or wall, and most of the guide rail spotlights can only irradiate in a fixed direction. In practical application, in order to make the irradiation effect of lamps better, the irradiation angle of lamps is needed to be adjusted according to specific conditions.

SUMMARY

The present disclosure provides an irradiation angle adjustment method and a lamp and an irradiation angle adjustment system lamp of a lamp.

According to one aspect of the present disclosure, there is provided an irradiation angle adjustment method of a lamp that may include a plurality of infrared receivers and a driving motor. The method may include receiving an infrared signal from a remote controller via the plurality of infrared receivers; determining an irradiation angle adjustment value of the lamp based on a plurality of infrared signal intensity values of the plurality of infrared receivers; and adjusting an irradiation angle of the lamp via the driving motor based on the irradiation angle adjustment value.

According to another aspect of the present disclosure, a lamp with an adjustable irradiation angle is provided. The lamp may include a plurality of infrared receivers, a driving motor and a processor. The plurality of infrared receivers may be configured to receive an infrared signal from a remote controller and transmit a plurality of infrared signal intensity values of the plurality of infrared receivers to the processor. The processor may be configured to determine an irradiation angle adjustment value of the lamp based on the plurality of infrared signal intensity values, and transmit the irradiation angle adjustment value to the driving motor. The driving motor may be configured to adjust an irradiation angle of the lamp based on the irradiation angle adjustment value.

According to a further aspect of the present disclosure, an irradiation angle adjustment system of a lamp is provided. The system may include a remote controller and the lamp according to the lamp as described above, in which the remote controller is configured to transmit the infrared signal to the lamp.

It is to be understood that both the foregoing general description and the following detailed description are exemplary and explanatory only and are not restrictive of the present disclosure.

BRIEF DESCRIPTION OF THE DRAWINGS

By reading the detailed description of the examples below, various other advantages and benefits will become clear to those skilled in the art. The drawings are for the purpose of showing examples only and are not considered to be a limitation of the present disclosure. Moreover, throughout the drawings, the same components are represented by the same reference symbols. In the drawings.

DETAILED DESCRIPTION

Examples of the present disclosure will be described in more detail below with reference to the accompanying drawings. Although examples of the present disclosure are shown in the accompanying drawings, it should be understood that the present disclosure may be implemented in various forms and should not be limited by the examples set forth herein. On the contrary, these examples are provided to enable a more thorough understanding of the present disclosure and to fully convey the scope of the present disclosure to those skilled in the art.

It should be noted that the features in the examples of the disclosure can be combined with each other without conflict.

Sometimes, when it is necessary to adjust the irradiation angle of the lamp, it is generally to adjust the irradiation angle of the lamp manually or by using tools, which can't intelligently adjust the irradiation angle according to personal wishes and cannot meet the needs of users.

Figure 1:
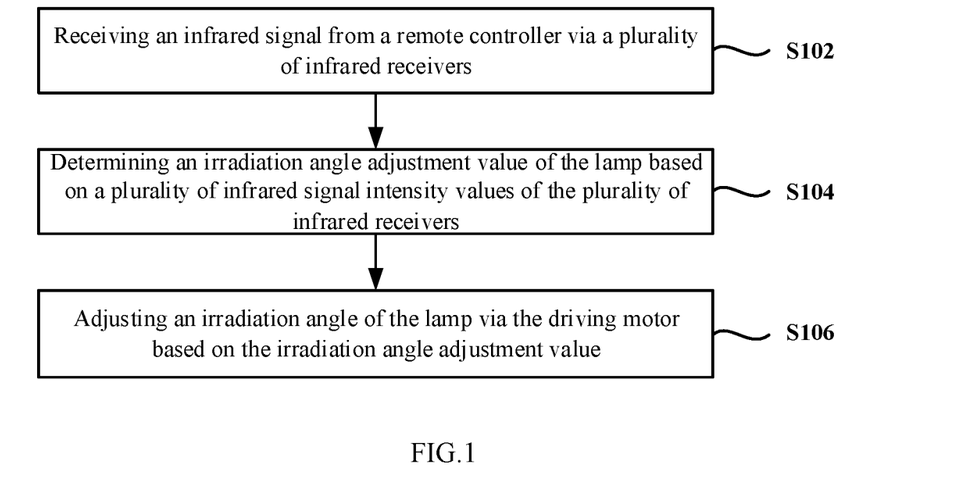
FIG. 1 is a flowchart of an irradiation angle adjustment method of a lamp according to an example of the present disclosure.

FIG. 1 is a flowchart of an irradiation angle adjustment method of a lamp according to an example of the present disclosure. In this example, the lamp comprises a plurality of infrared receivers and a driving motor.

As shown in FIG. 1, the irradiation angle adjustment method of the lamp according to the example of the present disclosure at least comprises: step S102, receiving an infrared signal from a remote controller via the plurality of infrared receivers; Step S104, determining an irradiation angle adjustment value of the lamp based on a plurality of infrared signal intensity values of the plurality of infrared receivers; and Step S106, adjusting an irradiation angle of the lamp via the driving motor based on the irradiation angle adjustment value.

The example of the disclosure provides the irradiation angle adjustment scheme of the lamp. In the example, the lamp comprises the plurality of infrared sensors and the driving motor. Firstly, the infrared signal from the remote controller is received by the plurality of infrared receivers, then the irradiation angle adjustment value of the lamp is determined based on the plurality of infrared signal intensity values received by the plurality of infrared receivers, and then, based on the irradiation angle adjustment value, the irradiation angle of the lamp is adjusted by the driving motor. The technical scheme provided by the example of the disclosure adjusts the irradiation angle of the lamp based on the plurality of infrared receivers and the driving motor, which can achieve better lighting effect, so as to meet the lighting needs of users in practical application. Further, when the irradiation angle of the lamp needs to be adjusted, the technical scheme provided by the example of the disclosure controls the irradiation angle of the lamp only by operating the remote controller, so as to realize the intelligent adjustment of the irradiation angle of the lamp and achieve better irradiation effect.

Figure 2:
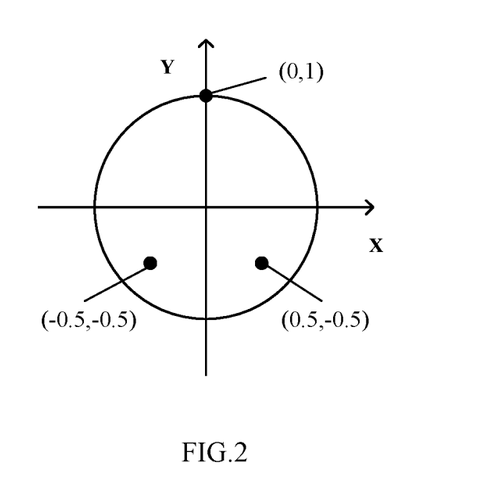
FIG. 2 is a schematic diagram of position coordinates of three infrared sensors according to an example of the present disclosure.

For the plurality of infrared receivers in step S102 described above, the installation position and the total number on the lamp can be selected according to actual requirements. Referring to FIG. 2, in an example of the disclosure, the lamp comprises three infrared receivers, the three infrared receivers are installed on the extension of the plane where the lamp is located, and in the X-Y rectangular coordinate system established with the lamp as the origin, the coordinates of the three infrared receivers are normalized to be (0, 1), (−0.5, −0.5) and (0.5, −0.5). In this example, three infrared receivers are installed on the extension of the plane where the lamp is located, and then the coordinates of the installation positions of the three infrared receivers are normalized to be (0, 1), (−0.5, −0.5) and (0.5, −0.5) in the X-Y axis plane rectangular coordinate system established with the lamp as the coordinate origin on the plane where the lamp is located. Here, the coordinates of the three infrared receivers are normalized to be (0, 1), (−0.5, −0.5) and (0.5, −0.5), that is, three points corresponding to the installation positions of the three infrared receivers are connected to form an isosceles triangle, and the vector sum of the three points on each of the X-axis and Y-axis is zero. Based on the scheme provided by the example, a coordinate system easy for algorithm calculation is established, and then the coordinates of the three infrared receivers are normalized, so as to simplify the calculation process. The scheme provided by the example simplifies the calculation complexity to the greatest extent and improves the product response speed.

In an example of the disclosure, a start button is arranged on the remote controller, a Bluetooth communication module is arranged in each of the remote controller and the lamp, and the remote controller and the lamp interact with each other via the Bluetooth communication modules. Before step S102 described above, the method further comprises: sending an irradiation angle adjustment start signal in response to pressing the start button of the remote controller; after receiving the start signal, the lamp turns on receiving the infrared signal.

For the irradiation angle adjustment value mentioned in step S104 described above, preferably, the irradiation angle adjustment value comprises X-axis and Y-axis adjustment values.

Furthermore, step S104 determines the irradiation angle adjustment value of the lamp based on the plurality of infrared signal intensity values of the plurality of infrared receivers. The example of the disclosure provides an optional scheme in which the proportional superposition algorithm is carried out based on the infrared signal intensity values received by the three infrared receivers to determine the X-axis and Y-axis adjustment values respectively. The scheme provided by the example of the disclosure directly carries out the proportional superposition algorithm for three infrared signal intensity values received by the three infrared receivers, so as to quickly determine the adjustment values of X-axis and Y-axis.

For the above proportional superposition algorithm, in an example of the present disclosure: the X-axis adjustment value=an infrared signal intensity value 1*0+an infrared signal intensity value 2*(−0.5)+an infrared signal intensity value 3*0.5; the Y-axis adjustment value=the infrared signal intensity value 1*1+the infrared signal intensity value 2*(−0.5)+the infrared signal intensity value 3*(−0.5).

In the example, the infrared signal intensity values 1, 2 and 3 are the infrared signal intensity values received by three infrared receivers respectively. In the scheme provided by the example, because the proportional superposition algorithm is easy to calculate, the X-axis adjustment value and Y-axis adjustment value are easy to calculate, so as to improve the adjustment efficiency.

The proportional superposition algorithm here can be interpreted as superimposing the three infrared signal intensity values received by the three infrared receivers according to the normalized coordinates. In other words, it is to multiply the three infrared signal intensity values by their corresponding coordinate normalization coefficients and then add the multiplication results. For example, taking the case of calculating the X-axis adjustment value as an example, the three infrared signal intensity values are multiplied by their corresponding X-axis coordinate normalization coefficients, that is, the X-axis adjustment value=the infrared signal intensity value 1*0+the infrared signal intensity value 2*(−0.5)+the infrared signal intensity value 3*0.5. The calculation of the Y-axis adjustment value is the same as the calculation of the X-axis adjustment value and will not be repeated here.

In an example of the disclosure, the driving motor in step S106 comprises an X-axis direction rotating motor and a Y-axis direction rotating motor.

Furthermore, for adjusting the irradiation angle of the lamp via the driving motor in step S106, it is preferable to drive the X-axis direction rotating motor and/or the Y-axis direction rotating motor to adjust the irradiation angle of the lamp based on the irradiation angle adjustment value. That is, in the example of the disclosure, on the one hand, the X-axis direction rotating motor is driven independently, and then the irradiation angle of the lamp in the X-axis direction is adjusted; on the other hand, the Y-axis direction rotating motor is driven independently, so as to adjust the irradiation angle of the lamp in the Y-axis direction. In addition, the X-axis and Y-axis rotating motors are driven simultaneously to adjust the irradiation angle of the lamp. The scheme provided by the example of the disclosure adjusts the irradiation angle of the lamp by driving the rotation of the motor.

The specific adjustment process is described in combination with the proportional superposition algorithm described above. If the calculated X-axis adjustment value is negative, the X-axis direction rotating motor is controlled to rotate in the negative direction of the X-axis. If the X-axis adjustment value is positive, the X-axis direction rotating motor is controlled to rotate in the positive direction of the X-axis. If the Y-axis adjustment value is negative, the Y-axis direction rotating motor is controlled to rotate in the negative direction of the Y-axis. If the Y-axis adjustment value is positive, the Y-axis direction rotating motor is controlled to rotate in the X-axis positive direction.

In order to meet the real-time requirements, in an example of the disclosure, the irradiation angle adjustment method of the lamp further comprises: in the process of adjusting the irradiation angle of the lamp via the driving motor, updating the X-axis and Y-axis adjustment values in real time based on the infrared signal intensity values that are updated in real time until that the X-axis and Y-axis adjustment values are zero to stop adjusting the irradiation angle of the lamp via the driving motor. In this example, with the continuous change of the irradiation angle of the lamp, the infrared signal intensity values received by the infrared receivers also change, so that the X-axis and Y-axis adjustment values are updated, and the rotation direction of the motor is controlled in real time according to the updated X-axis and Y-axis adjustment values until that the X-axis and Y-axis adjustment values are zero, the rotation of the motor is stopped and the adjustment is completed. Based on the scheme provided by the example, the X-axis and Y-axis adjustment values are updated in real time with the change of the irradiation angle of the lamp, so as to meet the real-time requirements.

In an example of the disclosure, the irradiation angle adjustment method of the lamp further includes: receiving an irradiation angle adjustment stop signal from the remote controller and stopping adjusting the irradiation angle of the lamp via the driving motor. In the example, when the irradiation angle adjustment stop signal from the remote controller is received, the rotation of the driving motor is stopped, so as to stop the adjustment of the irradiation angle of the lamp. The scheme provided by the example can adjust the irradiation angle of the lamp according to the user's wishes to improve the user's experience of using the product.

Figure 3:
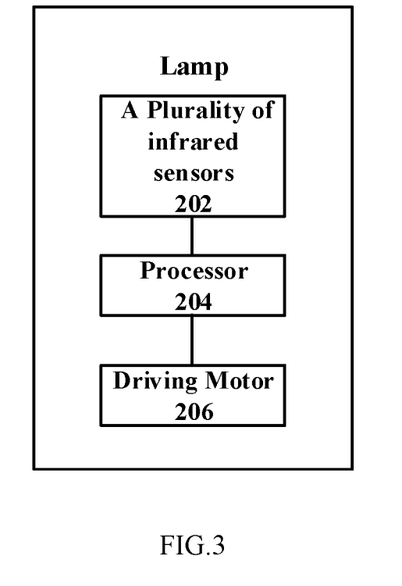
FIG. 3 is a structural block diagram of the lamp with adjustable irradiation angle according to an example of the present disclosure.

Based on the same inventive concept, the example of the disclosure further provides a lamp with adjustable irradiation angle. FIG. 3 is a structural block diagram of the lamp with adjustable irradiation angle according to an example of the disclosure.

As shown in FIG. 3, the structural block diagram of the lamp with adjustable irradiation angle according to the example of the present disclosure comprises at least: a plurality of infrared receivers 202 configured to receive an infrared signal from a remote controller and transmit a plurality of infrared signal intensity values of the infrared receivers to a processor; the processor 204 configured to determine an irradiation angle adjustment value of the lamp based on the plurality of infrared signal intensity values and transmit the irradiation angle adjustment value to a driving motor; and the driving motor 206 configured to adjust the irradiation angle of the lamp based on the irradiation angle adjustment value.

Figure 4:
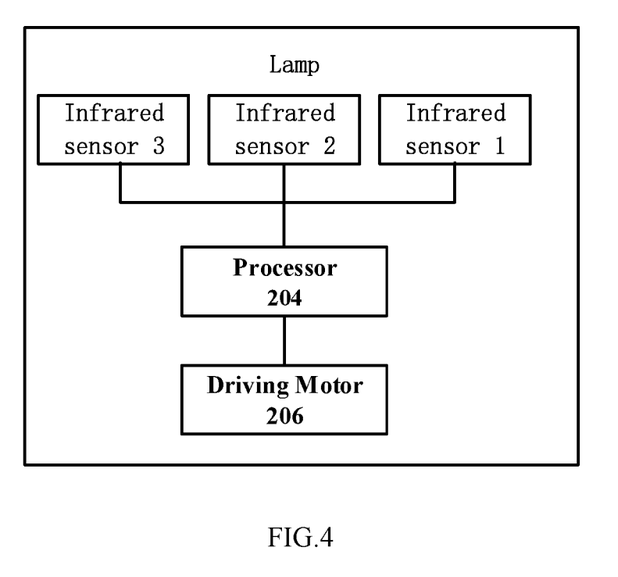
FIG. 4 is a structural block diagram of the lamp with adjustable irradiation angle according to an example of the present disclosure.

In an example, referring to FIGS. 2 and 4, the lamp comprises three infrared receivers, and the three infrared receivers are installed on the extension of the plane where the lamp is located, and the coordinates of the three infrared receivers are normalized to be (0, 1), (−0.5, −0.5) and (0.5, −0.5) in the X-Y rectangular coordinate established with the lamp as the origin.

In an example, the irradiation angle adjustment value comprises X-axis and Y-axis adjustment values, and the processor 104 is further configured to perform a proportional superposition algorithm on the infrared signal intensity values received by the three infrared receivers to determine the X-axis and Y-axis adjustment values respectively.

In an example, the X-axis adjustment value=an infrared signal intensity value 1*0+an infrared signal intensity value 2*(−0.5)+an infrared signal intensity value 3*0.5; the Y-axis adjustment value=the infrared signal intensity value 1*1+the infrared signal intensity value 2*(−0.5)+the infrared signal intensity value 3*(−0.5); the infrared signal intensity values 1, 2 and 3 are the infrared signal intensity values received by the three infrared receivers respectively.

In an example, in the process of adjusting the irradiation angle of the lamp via the driving motor 206, the processor 204 is further configured to update the X-axis and Y-axis adjustment values in real time based on the infrared signal intensity values that are updated in real time until the X-axis and Y-axis adjustment values are zero to stop adjusting the irradiation angle of the lamp via the driving motor.

In an example, the processor 204 is further configured to stop the adjustment of the irradiation angle of the lamp via the driving motor after receiving an irradiation angle adjustment stop signal from the remote controller.

Figure 5:
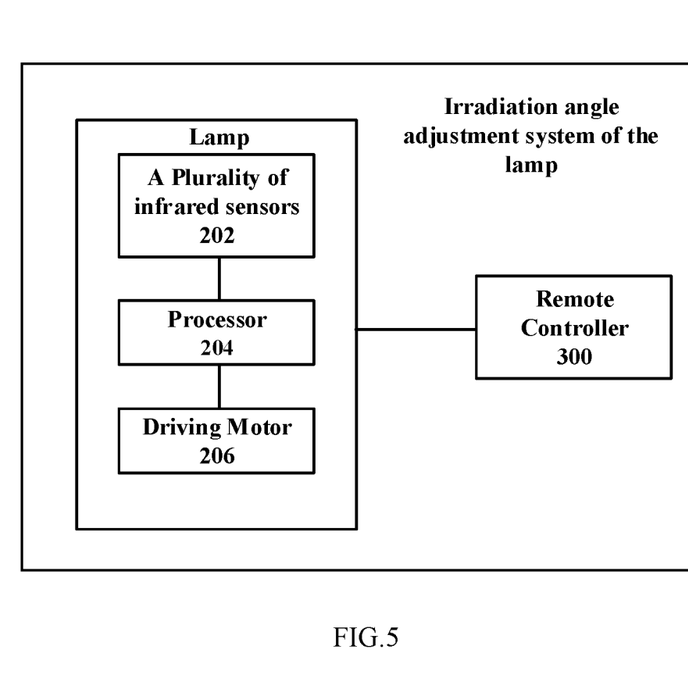
FIG. 5 is a block diagram of an irradiation angle adjustment system of the lamp according to an example of the present disclosure.

Based on the same inventive concept, the example of the disclosure further provides an irradiation angle adjustment system of a lamp. As shown in FIG. 5, the irradiation angle adjustment system of the lamp according to the example of the present disclosure comprises at least a remote controller 300 and any lamp as described above, and the remote controller 300 is configured to transmit the infrared signal to the lamp.

In an example, the remote controller 300 is further configured to be connected to the lamp in wireless communication; and the remote controller 300 is configured to send an irradiation angle adjustment start signal to the lamp and simultaneously transmit the infrared signal to the lamp; the lamp is configured to turn on the infrared receivers 202, the processor 204 and the driving motor 206 after receiving the start signal.

In an example, the remote controller 300 is further configured to send an irradiation angle adjustment stop signal to the lamp and simultaneously turn off transmitting the infrared signal; the lamp is further configured to stop an operation of the infrared receiver 202, the processor 204 and the driving motor 206 after receiving the stop signal.

The example of the disclosure provides the irradiation angle adjustment scheme of the lamp. In the example, the lamp comprises the plurality of infrared sensors and the driving motor. Firstly, the infrared signal from the remote controller is received by the plurality of infrared receivers, then the irradiation angle adjustment value of the lamp is determined based on the plurality of infrared signal intensity values received by the plurality of infrared receivers, and then based on the irradiation angle adjustment value, the irradiation angle of the lamp is adjusted by the driving motor. The technical scheme provided by the example of the disclosure adjusts the irradiation angle of the lamp based on the plurality of infrared receivers and the driving motor, and achieves better lighting effect, so as to meet the lighting needs of users in practical application. Further, when the irradiation angle of the lamp needs to be adjusted, the technical scheme provided by the example of the disclosure controls the irradiation angle of the lamp only by operating the remote controller, so as to realize the intelligent adjustment of the irradiation angle of the lamp and achieve better irradiation effect.

The disclosure provides an irradiation angle adjustment method and system of a lamp and a lamp with adjustable irradiation angle.

According to one aspect of the present disclosure, there is provided an irradiation angle adjustment method of a lamp, the lamp comprises a plurality of infrared receivers and a driving motor, and the method comprises: receiving an infrared signal from a remote controller via the plurality of infrared receivers; determining an irradiation angle adjustment value of the lamp based on a plurality of infrared signal intensity values of the plurality of infrared receivers; and adjusting an irradiation angle of the lamp via the driving motor based on the irradiation angle adjustment value.

Optionally, the lamp comprises three infrared receivers, the three infrared receivers are mounted on an extension of a plane where the lamp is located, and coordinates of the three infrared receivers are normalized to be (0, 1), (−0.5, −0.5) and (0.5, −0.5) in an X-Y rectangular coordinate that is established with the lamp as an origin.

Optionally, the irradiation angle adjustment value comprises an X-axis adjustment value and a Y-axis adjustment value, and determining the irradiation angle adjustment value of the lamp based on the plurality of infrared signal intensity values of the plurality of infrared receivers comprises: performing a proportional superposition algorithm based on infrared signal intensity values respectively received by the three infrared receivers to determine the X-axis adjustment value and the Y-axis adjustment value.

Optionally, the X-axis adjustment value=an infrared signal intensity value 1*0+an infrared signal intensity value 2*(−0.5)+an infrared signal intensity value 3*0.5; the Y-axis adjustment value=the infrared signal intensity value 1*1+the infrared signal intensity value 2*(−0.5)+the infrared signal intensity value 3*(−0.5); where the infrared signal intensity value 1, the infrared signal intensity value 2 and the infrared signal intensity value 3 are the infrared signal intensity values received by the three infrared receivers, respectively.

Optionally, the method described above further comprises: update the X-axis adjustment value and the Y-axis adjustment value in real time based on the infrared signal intensity values that are updated in real time, in a process of adjusting the irradiation angle of the lamp via the driving motor, until that the X-axis adjustment value and the Y-axis adjustment value are zero to stop adjusting the irradiation angle of the lamp via the driving motor.

Optionally, the method described above further comprises: receiving an irradiation angle adjustment stop signal from the remote controller, and stopping adjusting the irradiation angle of the lamp via the driving motor.

According to another aspect of the present disclosure, there is further provided a lamp with an adjustable irradiation angle, the lamp comprises a plurality of infrared receivers, a driving motor and a processor. The plurality of infrared receivers are configured to receive an infrared signal from a remote controller and transmit a plurality of infrared signal intensity values of the plurality of infrared receivers to the processor. The processor is configured to determine an irradiation angle adjustment value of the lamp based on the plurality of infrared signal intensity values, and transmit the irradiation angle adjustment value to the driving motor. The driving motor is configured to adjust an irradiation angle of the lamp based on the irradiation angle adjustment value.

Optionally, the lamp comprises three infrared receivers, the three infrared receivers are mounted on an extension of a plane where the lamp is located, and coordinates of the three infrared receivers are normalized to be (0, 1), (−0.5, −0.5) and (0.5, −0.5) in an X-Y rectangular coordinate that is established with the lamp as an origin.

Optionally, the irradiation angle adjustment value comprises an X-axis adjustment value and a Y-axis adjustment value, and the processor is further configured to perform a proportional superposition algorithm based on infrared signal intensity values respectively received by the three infrared receivers to determine the X-axis adjustment value and the Y-axis adjustment value.

Optionally, the X-axis adjustment value=an infrared signal intensity value 1*0+an infrared signal intensity value 2*(−0.5)+an infrared signal intensity value 3*0.5; the Y-axis adjustment value=the infrared signal intensity value 1*1+the infrared signal intensity value 2*(−0.5)+the infrared signal intensity value 3*(−0.5); where the infrared signal intensity value 1, the infrared signal intensity value 2 and the infrared signal intensity value 3 are the infrared signal intensity values received by the three infrared receivers respectively.

Optionally, the processor is further configured to, in a process of the driving motor adjusting the irradiation angle of the lamp, update the X-axis adjustment value and the Y-axis adjustment value in real time based on the infrared signal intensity values that are updated in real time until that the X-axis adjustment value and the Y-axis adjustment value are zero to stop adjusting the irradiation angle of the lamp via the driving motor.

Optionally, the processor is further configured to stop adjusting the irradiation angle of the lamp via the driving motor after receiving an irradiation angle adjustment stop signal from the remote controller.

According to another aspect of the present disclosure, there is further provided an irradiation angle adjustment system of a lamp comprising: a remote controller and the lamp according to any one as described above, in which the remote controller is configured to transmit the infrared signal to the lamp.

Optionally, the remote controller is further configured to be connected with the lamp in wireless communication, and the remote controller is configured to send an irradiation angle adjustment start signal to the lamp and simultaneously transmit the infrared signal to the lamp; and the lamp is configured to turn on the plurality of infrared receivers, the processor and the driving motor after receiving the irradiation angle adjustment start signal.

Optionally, the remote controller is further configured to send an irradiation angle adjustment stop signal to the lamp and simultaneously turn off transmitting the infrared signal; and the lamp is further configured to stop an operation of the plurality of infrared receivers, the processor and the driving motor after receiving the irradiation angle adjustment stop signal.

The examples of the disclosure provide the irradiation angle adjustment scheme of the lamp. In the examples, the lamp comprises the plurality of infrared sensors and the driving motor. Firstly, the infrared signal from the remote controller is received by the plurality of infrared receivers, then the irradiation angle adjustment value of the lamp is determined based on the plurality of infrared signal intensity values received by a plurality of infrared receivers, and then based on the irradiation angle adjustment value, the irradiation angle of the lamp is adjusted by the driving motor. The technical scheme provided by the examples of the disclosure adjusts the irradiation angle of the lamp based on the plurality of infrared receivers and the driving motor, which can achieve better lighting effect, so as to meet the lighting needs of users in practical application. Further, when the irradiation angle of the lamp needs to be adjusted, the technical scheme provided by the examples of the disclosure controls the irradiation angle of the lamp only by operating the remote controller, so as to realize the intelligent adjustment of the irradiation angle of the lamp and achieve better irradiation effect.

The above description is only an overview of the technical scheme of the disclosure. In order to better understand the technical means of the disclosure so that it can be implemented according to the contents of the description and in order to make the above and other objects, features and advantages of the disclosure more obvious and easy to be understood, the examples of the disclosure are given below.

According to the following detailed description of examples of the disclosure in combination with the accompanying drawings, those skilled in the art will better understand the above and other objects, advantages and features of the disclosure.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

At this point, those skilled in the art should recognize that although a plurality of examples of the disclosure have been shown and described in detail herein, many other variants or modifications in accordance with the principles of the disclosure can be directly determined or derived according to the contents of the disclosure of the disclosure without departing from the spirit and scope of the disclosure. Therefore, the scope of the disclosure should be understood and recognized as covering all these other variants or modifications.

What is claimed is:

1. An irradiation angle adjustment method of a lamp that comprises a plurality of infrared receivers and a driving motor, comprising:
   receiving an infrared signal from a remote controller via the plurality of infrared receivers;
   determining an irradiation angle adjustment value of the lamp based on a plurality of infrared signal intensity values of the plurality of infrared receivers;
   adjusting an irradiation angle of the lamp via the driving motor based on the irradiation angle adjustment value;
   receiving an irradiation angle adjustment stop signal from the remote controller; and
   stopping adjusting the irradiation angle of the lamp via the driving motor.

2. The irradiation angle adjustment method according to claim 1, wherein the lamp comprises three infrared receivers, the three infrared receivers are mounted on an extension of a plane where the lamp is located, and coordinates of the three infrared receivers are normalized to be (0, 1), (−0.5, −0.5) and (0.5, −0.5) in an X-Y rectangular coordinate that is established with the lamp as an origin.

3. The irradiation angle adjustment method according to claim 2, wherein:
   the irradiation angle adjustment value comprises an X-axis adjustment value and a Y-axis adjustment value, and
   determining the irradiation angle adjustment value of the lamp based on the plurality of infrared signal intensity values of the plurality of infrared receivers comprises:
   performing a proportional superposition algorithm based on infrared signal intensity values respectively received by the three infrared receivers to determine the X-axis adjustment value and the Y-axis adjustment value.

4. The irradiation angle adjustment method according to claim 3, wherein
   the X-axis adjustment value=an infrared signal intensity value 1*0+an infrared signal intensity value 2*(−0.5)+an infrared signal intensity value 3*0.5; and
   the Y-axis adjustment value=the infrared signal intensity value 1*1+the infrared signal intensity value 2*(−0.5)+the infrared signal intensity value 3*(−0.5), and
   where the infrared signal intensity value 1, the infrared signal intensity value 2 and the infrared signal intensity value 3 are the infrared signal intensity values received by the three infrared receivers.

5. The irradiation angle adjustment method according to claim 3, further comprising:
   updating the X-axis adjustment value and the Y-axis adjustment value in real time based on the infrared signal intensity values that are updated in real time, in a process of adjusting the irradiation angle of the lamp via the driving motor, until that the X-axis adjustment value and the Y-axis adjustment value are zero to stop adjusting the irradiation angle of the lamp via the driving motor.

6. A lamp with an adjustable irradiation angle, the lamp comprising a plurality of infrared receivers, a driving motor and a processor, wherein:
   the plurality of infrared receivers are configured to receive an infrared signal from a remote controller and transmit a plurality of infrared signal intensity values of the plurality of infrared receivers to the processor;
   the processor is configured to determine an irradiation angle adjustment value of the lamp based on the plurality of infrared signal intensity values, and transmit the irradiation angle adjustment value to the driving motor;
   the driving motor is configured to adjust an irradiation angle of the lamp based on the irradiation angle adjustment value; and
   the processor is further configured to stop adjusting the irradiation angle of the lamp via the driving motor after receiving an irradiation angle adjustment stop signal from the remote controller.

7. The lamp according to claim 6, wherein the lamp comprises three infrared receivers, the three infrared receivers are mounted on an extension of a plane where the lamp is located, and coordinates of the three infrared receivers are normalized to be (0, 1), (−0.5, −0.5) and (0.5, −0.5) in an X-Y rectangular coordinate that is established with the lamp as an origin.

8. The lamp according to claim 7, wherein:
the irradiation angle adjustment value comprises an X-axis adjustment value and a Y-axis adjustment value, and
the processor is further configured to perform a proportional superposition algorithm based on infrared signal intensity values respectively received by the three infrared receivers to determine the X-axis adjustment value and the Y-axis adjustment value.

9. The lamp according to claim 8, wherein
the X-axis adjustment value=an infrared signal intensity value 1*0+an infrared signal intensity value 2*(−0.5)+an infrared signal intensity value 3*0.5; and
the Y-axis adjustment value=the infrared signal intensity value 1*1+the infrared signal intensity value 2*(−0.5)+the infrared signal intensity value 3*(−0.5), and where the infrared signal intensity value 1, the infrared signal intensity value 2 and the infrared signal intensity value 3 are the infrared signal intensity values received via the three infrared receivers, respectively.

10. The lamp according to claim 8, wherein the processor is further configured to, in a process of the driving motor adjusting the irradiation angle of the lamp, update the X-axis adjustment value and the Y-axis adjustment value in real time based on the infrared signal intensity values that are updated in real time until that the X-axis adjustment value and the Y-axis adjustment value are zero to stop adjusting the irradiation angle of the lamp via the driving motor.

11. An irradiation angle adjustment system of a lamp comprising:
a remote controller and a lamp, wherein:
the lamp comprises an adjustable irradiation angle, a plurality of infrared receivers, a driving motor and a processor, and the plurality of infrared receivers are configured to receive an infrared signal from a remote controller and transmit a plurality of infrared signal intensity values of the plurality of infrared receivers to the processor, the processor is configured to determine an irradiation angle adjustment value of the lamp based on the plurality of infrared signal intensity values, and transmit the irradiation angle adjustment value to the driving motor; and the driving motor is configured to adjust an irradiation angle of the lamp based on the irradiation angle adjustment value;
the remote controller is configured to transmit the infrared signal to the lamp;
the remote controller is further configured to send an irradiation angle adjustment stop signal to the lamp and simultaneously turn off transmitting the infrared signal; and
the lamp is further configured to stop an operation of the plurality of infrared receivers, the processor and the driving motor after receiving the irradiation angle adjustment stop signal.

12. The irradiation angle adjustment system according to claim 11, wherein
the remote controller is further configured to be connected with the lamp in wireless communication, and the remote controller is configured to send an irradiation angle adjustment start signal to the lamp and simultaneously transmit the infrared signal to the lamp; and
the lamp is configured to turn on the plurality of infrared receivers, the processor and the driving motor after receiving the irradiation angle adjustment start signal.

13. The irradiation angle adjustment system according to claim 11, wherein the lamp comprises three infrared receivers, the three infrared receivers are mounted on an extension of a plane where the lamp is located, and coordinates of the three infrared receivers are normalized to be (0, 1), (−0.5, −0.5) and (0.5, −0.5) in an X-Y rectangular coordinate that is established with the lamp as an origin.

14. The irradiation angle adjustment system according to claim 13, wherein:
the irradiation angle adjustment value comprises an X-axis adjustment value and a Y-axis adjustment value, and
the processor is further configured to perform a proportional superposition algorithm based on infrared signal intensity values respectively received by the three infrared receivers to determine the X-axis adjustment value and the Y-axis adjustment value.

15. The irradiation angle adjustment system according to claim 14, wherein
the X-axis adjustment value=an infrared signal intensity value 1*0+an infrared signal intensity value 2*(−0.5)+an infrared signal intensity value 3*0.5; and
the Y-axis adjustment value=the infrared signal intensity value 1*1+the infrared signal intensity value 2*(−0.5)+the infrared signal intensity value 3*(−0.5), and
where the infrared signal intensity value 1, the infrared signal intensity value 2 and the infrared signal intensity value 3 are the infrared signal intensity values received via the three infrared receivers, respectively.

16. The irradiation angle adjustment system according to claim 14, wherein the processor is further configured to, in a process of the driving motor adjusting the irradiation angle of the lamp, update the X-axis adjustment value and the Y-axis adjustment value in real time based on the infrared signal intensity values that are updated in real time until that the X-axis adjustment value and the Y-axis adjustment value are zero to stop adjusting the irradiation angle of the lamp via the driving motor.

* * * * *